March 24, 1936.   M. LOUGHEAD   2,034,915
BRAKE MECHANISM
Original Filed March 7, 1929   3 Sheets-Sheet 1

Inventor
Malcolm Loughead
By Williams, Bradbury, McCaleb-Hinkle
Attys.

March 24, 1936.          M. LOUGHEAD          2,034,915
BRAKE MECHANISM
Original Filed March 7, 1929     3 Sheets-Sheet 2
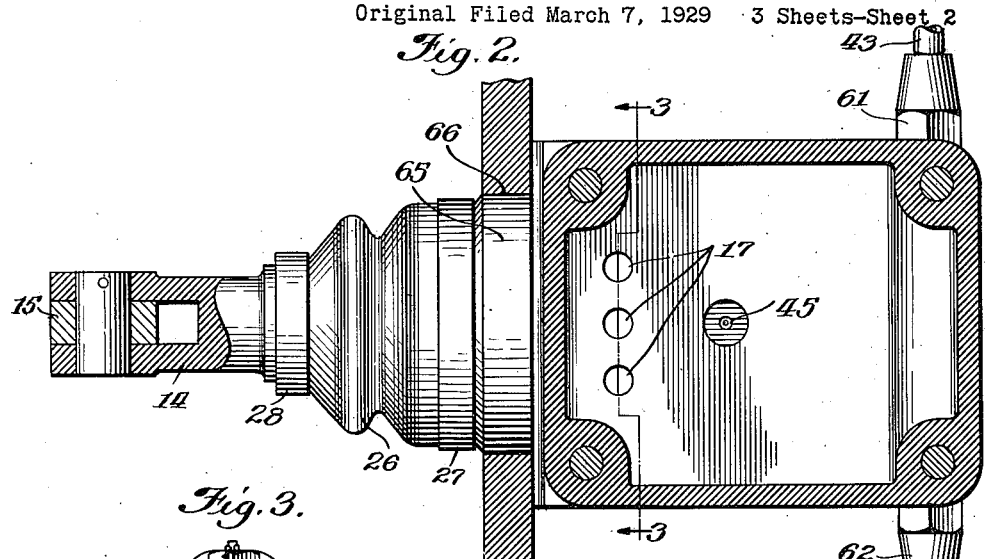
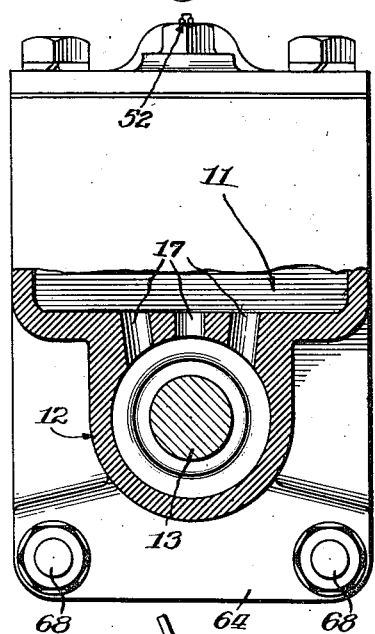
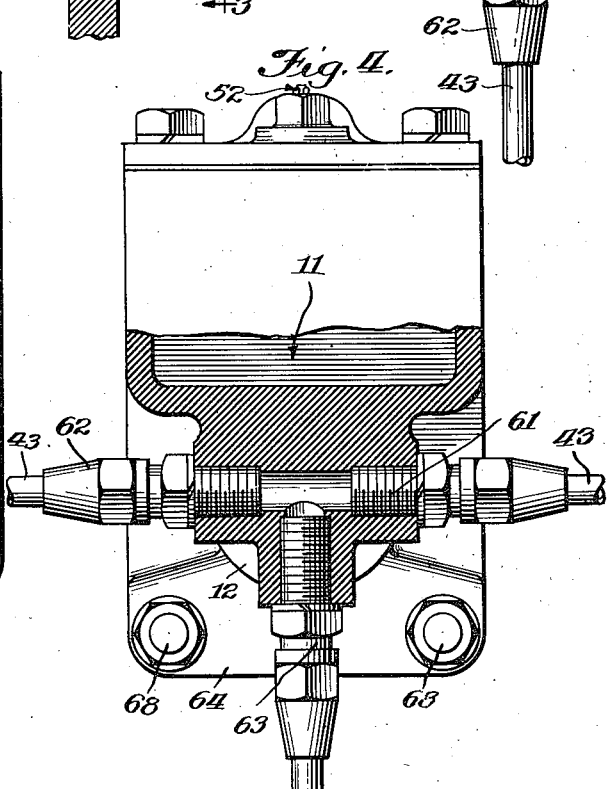
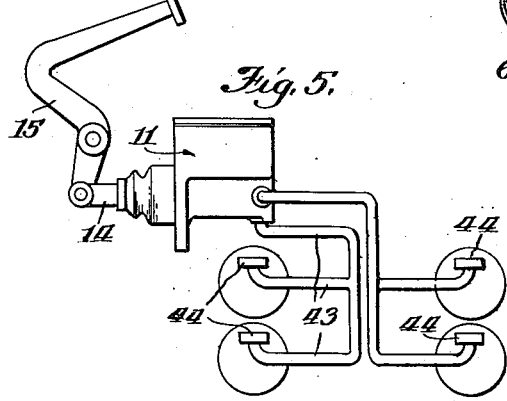
Inventor
Malcolm Loughead
By Williams, Bradbury, McCaleb-Hinkle
Attys.

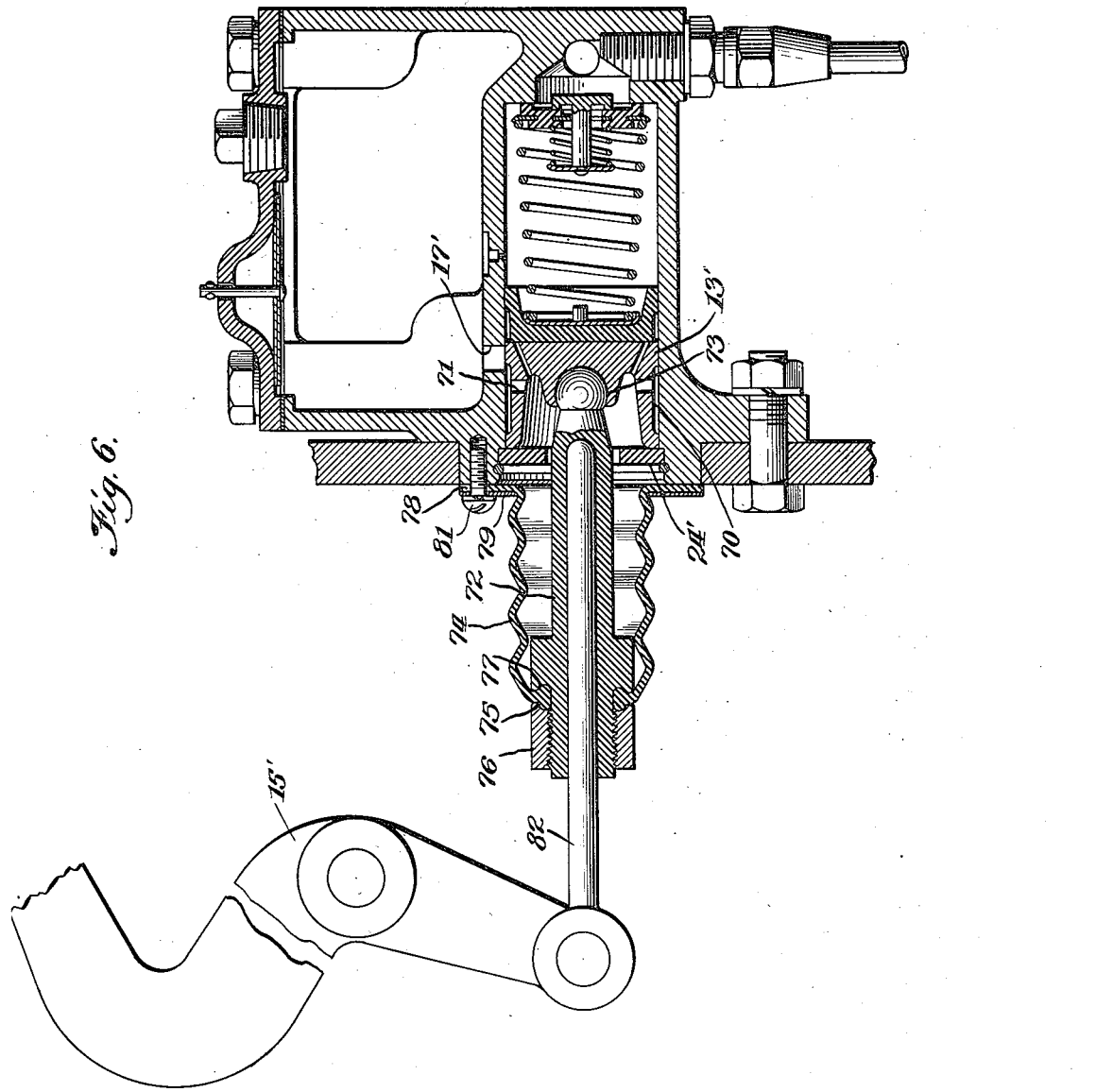

Patented Mar. 24, 1936

2,034,915

UNITED STATES PATENT OFFICE 2,034,915

BRAKE MECHANISM

Malcolm Loughead, Mokelumne Hill, Calif., assignor to Hydraulic Brake Company, Los Angeles, Calif., a corporation of California Application March 7, 1929, Serial No. 344,998
Renewed May 19, 1934

6 Claims. (Cl. 60—54.6)

My invention relates to a brake mechanism and more particularly to a hydraulically operated brake system.

In certain types of automobiles it is desirable to have the supply reservoir and fluid pressure mechanism in one compact unit in order to require as little space as possible and effect a large economy in the time required to install the system in an automobile. Hydraulic brake systems are often made by a manufacturer of such systems and installed in automobiles by the manufacturer of the automobile. The facility with which a brake system may be installed in a car is therefore an important feature.

An object of the invention is to provide a new and improved pressure and supply unit for hydraulic brake systems.

A further object is to provide a reservoir and cylinder unit which is readily attachable to a vehicle.

A further object is to provide a pressure and supply unit in which the actuating mechanism for the piston contacts with the piston through the open end of the cylinder.

A further object is to provide a pressure and supply unit having a piston provided with a fluid seal to prevent air from entering the cylinder.

A further object is to provide a pressure and supply unit in which a large and direct communication is established between the fluid seal of the piston and the reservoir, permitting air entering the fluid seal readily to pass into the reservoir.

In accordance with the general features of the invention, an integral reservoir and cylinder is provided in which the fluid from the reservoir is in direct and constant communication with a fluid seal surrounding the piston, permitting the rearward end of the piston to be exposed to atmospheric pressure without danger of entrapping air in the cylinder.

Referring to the drawings:

Fig. 2 is a sectional plan view taken on lines 2—2 of Fig. 1;

Fig. 3 is an end elevation, partly in section, taken on lines 3—3 of Fig. 1;

Fig. 4 is an end elevation, partly in section, taken on line 4—4 of Fig. 1;

Fig. 5 is a schematic view of the hydraulic brake system embodying the invention; and Fig. 6 illustrates a modified form of the invention.

Figure 1:
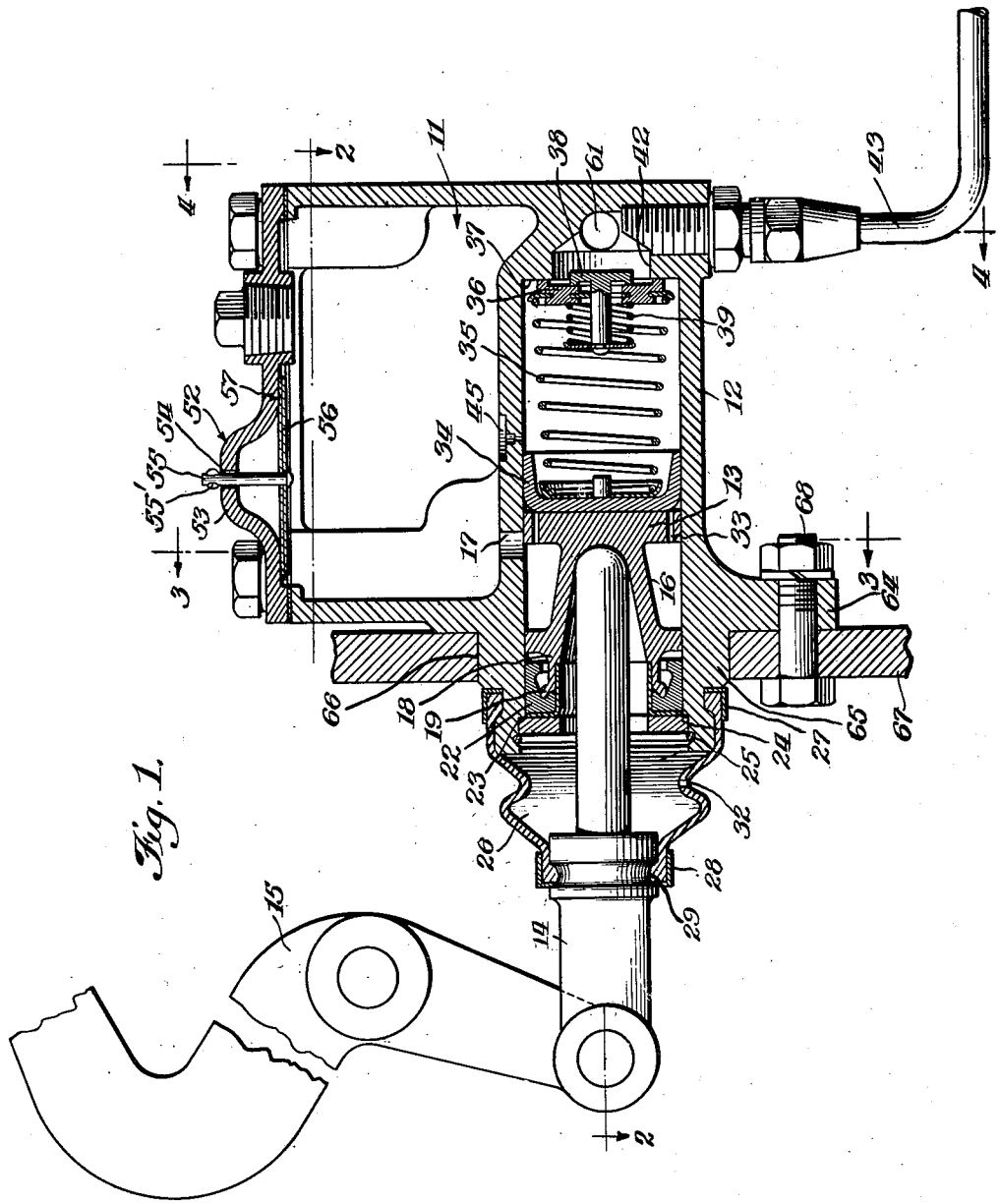
Fig. 1 is a cross-section of the pressure and supply unit embodying my invention.

The apparatus comprises, in general, a reservoir 11 having a cylinder 12 cast integrally therewith and a piston 13 exposed rearwardly to atmospheric pressure and movable forwardly by a plunger 14 actuated by a foot pedal 15.

The piston 13 has an annular recess 16 of such length as to be in constant communication with a plurality of passages 17 leading into the fluid reservoir and thus forming a fluid seal about the piston. The piston has a reduced portion 18 which terminates in an outwardly projecting flange 19. A packing ring 22 is clamped between a collar 23 and the flange 19 for retaining the packing ring in contact with the cylinder wall and allowing the forward end of the packing ring to resiliently engage the cylinder wall. An end ring 24 secured in position by a split ring 25 is provided to prevent the withdrawal of the piston from the cylinder.

In order to exclude dust and other extraneous matter from the piston a boot 26 is retained by an annular collar 27 within an annular groove in the outer cylinder wall, the other end of the boot being attached to plunger 14 by a collar 28 which similarly retains this end of the boot in a groove 29 in the plunger. The boot is provided with an aperture 32 in its lower side to permit free access of air into and from the boot to compensate for changes of volume within the boot so that the rearward end of the piston will at all times be subject to atmospheric pressure.

A plurality of passages 33 lead from the annular recess in the piston into cylinder 12. The face of the piston is provided with a packing cup 34 which is adapted to cover passages 33 during the protractile stroke of the piston to cut off communication between the recess and the cylinder during the pressure stroke of the piston. During the retractile stroke of the piston the low pressure within the cylinder causes packing cup 34 to be unseated and allow fluid from recess 16 to flow by the packing cup into the cylinder. The piston is moved to its retracted position by a spring 35 which also serves to urge a valve 36 against valve seat 37 in the forward end of the cylinder. A second valve 38 is mounted concentrically in valve 36 and is retained in its closed position by a spring 39.

In the application of the brakes the piston is moved forwardly to produce a fluid pressure in the cylinder, causing valve 38 to open and allow fluid from the cylinder to pass into an exit chamber 42 which leads to a plurality of pipes 43 connected to the wheel brake cylinders 44. In releasing the brakes pedal 15 is allowed to return to its normal position, withdrawing plunger 14 from the piston and allowing spring 35 to return the piston to its normal position. The area of valve 36 is so related to the area of the face of the piston that a positive fluid pressure will be maintained in the fluid lines 43 and wheel brake cylinders 44. As spring 35 tends to retract the piston a low pressure will be created within the cylinder and as the rear face of the piston is subject to atmospheric pressure a positive pressure of six pounds per square inch above atmospheric pressure will be maintained in the fluid pressure lines on account of the smaller area of valve 36. Thus it will be impossible for the retraction of the piston to cause a negative pressure in the fluid lines or wheel brake cylinder which might cause air to enter the wheel brake cylinders and interfere with the proper operation of the brake system. On account of the retardation of the return of the fluid to cylinder 12 and the low pressure caused in cylinder 12 thereby, fluid will flow from recess 16 through passages 33 into the cylinder during the retraction of the piston, producing an excess of fluid in the cylinder after the piston is retracted. This excess of fluid passes through an aperture 45 which is immediately in front of the retracted position of the piston into the fluid reservoir, as the fluid from the wheel brake cylinders returns to the master cylinder, thus assuring that the master cylinder will always be filled to capacity with brake fluid.

It will be noted that the low pressure in the cylinder will not be communicated to the packing ring 22 on account of the fluid seal around the piston which is in communication with the reservoir and the fluid passing from the fluid seal into the cylinder will be immediately replaced by fluid from the reservoir. However, if any air should pass by the packing ring 22 into the fluid seal it will rise to the top of the fluid seal and pass through one of the passages 17 into the fluid reservoir.

The top of the fluid reservoir is provided with a valve 52 which serves to admit air into the cylinder as the supply of fluid declines and excludes dust and foreign matter from the reservoir. Valve 52 comprises a hollow cap 53 having an aperture 54 therein. A valve stem 55 extends through aperture 54 and serves to hold a diaphragm valve 56 against seat 57 formed by the periphery of cap 53. The upper end of stem 55 is provided with a plurality of punched-out portions 55' which serve to prevent the stem from being withdrawn from aperture 54. As the amount of fluid within the reservoir decreases diaphragm 56 will be forced downwardly by atmospheric pressure to admit an amount of air corresponding to the decrease in the amount of fluid.

The forward end of cylinder 12 is spaced a sufficient distance from the forward wall of the reservoir to provide space for the discharge chamber 42 between the end of the cylinder and the forward wall of the unit. A plurality of plugs 61, 62, and 63 are threaded into discharge chamber 42 and make connection with the fluid pressure lines 43. Plugs 61 and 62 lead to the front brakes of the vehicle and plug 63 leads to the rear brakes.

The rear end of the unit is provided with a downwardly projecting flange 64. In attaching the unit to a vehicle the cylindrical portion 65 of the unit which extends rearwardly from the unit is placed in a similarly shaped aperture 66 in a wall 67 of the vehicle. A pair of bolts 68 pass through wall 67 and flange 64 and serve to retain the unit firmly attached to the wall.

Fig. 6 illustrates a modified form of the invention in which the piston 13' is provided with an annular recess 70. This recess is connected through passages 71 to the interior of the piston, connecting the interior of the piston through passages 17' with the fluid reservoir. A plunger 72 is attached to the piston by a ball and socket joint 73. The rear side of the piston is enclosed by a boot 74, one end of which is provided with an annular bead 75 secured to the plunger by a nut 76 which forces the annular bead against an undercut shoulder 77 formed upon the plunger. The other end of the boot is provided with a radially extending flange 78 which is secured by a plate 79 and screws 81 to the rear end of the cylinder. The boot 74 thus forms a fluid chamber which is constantly maintained full of fluid from the fluid reservoir which passes through passages 17' into the annular recess 70 through passages 71 into the interior of the piston and past ring 24', which limits the rearward movement of the piston. The clearance between the plunger 72 and ring 24' is sufficient to allow free communication of fluid with the boot. Connection with the actuating lever 15' is made through a rod 82 which engages a tubular bore within the plunger, allowing the lever 15' to return to its normal position without positively retracting plunger 72.

The operation of this embodiment of the invention is similar to that shown in the previous figures. In this embodiment it is impossible to produce a lower than atmospheric pressure within the fluid chamber formed by the boot, due to the fact that when liquid is drawn into the master cylinder upon the retractile movement of the piston, the boot will contract when fluid is drawn therefrom without producing a lower than atmospheric pressure therein. Furthermore, the fluid drawn into the master cylinder during the retractile movement of the piston will be constantly replaced by fluid from the fluid reservoir with the result that no air can leak into the master cylinder from the rearward end of the piston, in spite of the fact that mechanical connection is made between the actuating lever and the piston to actuate the piston within the master cylinder.

Having described the nature and embodiments of my invention, what I desire to secure by United States Letters Patent is as follows:

1. In a hydraulic brake mechanism, a cylinder, a fluid supply reservoir mounted thereon, a piston slidably mounted in the cylinder and having an annular recess, an aperture in the wall of the reservoir communicating with the recess and forming a fluid seal, a packing ring surrounding the piston rearwardly of the fluid seal, a packing cup carried by the face of the piston, said piston having a passage between the recess and the cylinder and normally covered by the packing cup, said reservoir having an aperture immediately in front of the retracted position of the piston, a double acting check valve at the discharge end of the cylinder for retarding the return flow of fluid to the cylinder, means for moving the piston forward to produce a fluid pressure in the cylinder, and a spring for retracting the piston causing a low pressure in the cylinder where fluid from the reservoir passes into the cylinder through the annular recess and passage in the piston.

2. In a hydraulic brake mechanism, a cylinder having a cylindrical bore, an integral cap for the end of the cylinder having a smaller bore forming a shoulder to provide a valve seat, a discharge tube threaded into the integral cap and leading into the smaller bore, a double check valve adapted to engage said valve seat, a piston movable in the cylinder and having an annular recess, a fluid supply reservoir mounted on the cylinder communicating with said recess, means engaging the piston for moving the piston forward to produce a fluid pressure, and a spring for retracting the piston and yieldingly urging said valve to its seat to retard the return of the liquid to the cylinder.

3. In a hydraulic brake mechanism, a cylinder and reservoir comprising a unit having a plurality of walls, the end of the cylinder being spaced from the front wall of the unit to provide a discharge chamber therebetween, a piston movable in the cylinder, a double acting valve interposed between the cylinder and the discharge chamber, a spring having one end engaging the piston and the other end engaging the valve, and means for positively moving the piston forward to produce a fluid pressure in the cylinder, said spring acting to retract the piston and yieldingly urge the valve forward to maintain a positive pressure in the discharge chamber.

4. In a hydraulic brake mechanism, a cylinder and reservoir unit comprising a cylinder and reservoir integrally cast, a piston having an annular recess and movable within the cylinder, having its rear end exposed to atmospheric pressure, an aperture interconnecting the reservoir and said recess, a passage in the piston connecting the recess with the cylinder, a packing cup carried by the piston for closing said passage during the compression stroke of the piston and uncovering said passage during the retractile stroke, an aperture in the cylinder wall immediately in front of the retracted position of the piston and communicating with the reservoir, a double acting valve at the discharge end of the piston for maintaining a positive pressure beyond the cylinder, means for moving the piston forwardly to produce an operating pressure, and a spring for retracting the piston causing fluid to enter the cylinder through the passage in the piston, the excess fluid being returned to the reservoir when the piston is completely retracted.

5. In a fluid pressure mechanism of the class described, a cylinder having a cylindrical bore, an integral cap for an end of the cylinder having a smaller bore forming a shoulder to provide a valve seat, a discharge tube threaded into the integral cap and leading into the smaller bore, a double check valve adapted to engage said valve seat, a piston movable in said cylinder, said piston having a passageway therethrough and means for closing said passageway during the forward stroke of the piston but permitting flow therethrough during its return stroke, means engaging the piston for moving the piston forward to produce a fluid pressure, a spring for retracting the piston and yieldingly urging said valve to its seat to retard the return of the liquid to the cylinder, a flexible boot enclosing the rear of said piston, said boot having its interior in communication with said passageway whereby fluid can flow from the interior of the boot through said passageway during the return stroke of the piston, and a fluid reservoir communicating with the interior of said boot.

6. In hydraulic mechanism of the class described, a cylinder and reservoir comprising a unit having a plurality of walls, the end of the cylinder being spaced from the front wall of the unit to provide a discharge chamber therebetween, a piston movable in the cylinder, a double-acting valve interposed between the cylinder and the discharge chamber, a spring having one end engaging the piston and the other end engaging the valve, means for positively moving the piston forward to produce a fluid pressure in the cylinder, said spring acting to retract the piston and yieldingly urge the valve forward to maintain a positive pressure in the discharge chamber during the retraction of the piston, said piston having a passageway therethrough, means for closing said passageway during the forward stroke of the piston but permitting flow through said passageway during the return stroke of the piston, a flexible boot enclosing the rear of said piston and communicating with said passageway whereby fluid can flow from the interior of the boot through said passageway during the return stroke of the piston, and a fluid reservoir communicating with the interior of said boot.

MALCOLM LOUGHEAD.